United States Patent [19]

Markoff et al.

[11] Patent Number: 5,058,039
[45] Date of Patent: Oct. 15, 1991

[54] SYSTEM OF OPERATING AN AUTOMATIC PLOTTER USING DIFFERENT SIZE MARKING DEVICES

[76] Inventors: Jay Markoff, 1940 Third Ave., #403, San Diego, Calif. 92101; John R. Deubert, 1040 S. Coast Blvd., #202, La Jolla, Calif. 92037

[21] Appl. No.: 395,745

[22] Filed: Aug. 18, 1989

Related U.S. Application Data

[63] Continuation-in-part of Ser. No. 291,537, Dec. 28, 1988, Pat. No. 4,933,876.

[51] Int. Cl.⁵ .......................................... G06K 15/00
[52] U.S. Cl. ............................. 364/520; 346/139 R
[58] Field of Search ............................. 364/518–520, 364/523, 237.7 MS, 929.3 MS; 346/139 R, 140 R, 155, 1.1

[56] References Cited

U.S. PATENT DOCUMENTS

| | | | |
|---|---|---|---|
| 3,909,831 | 9/1975 | Marchio et al. | 356/140 R |
| 4,282,536 | 8/1987 | Paschen et al. | 346/140 R |
| 4,591,999 | 5/1986 | Logan | 364/523 |
| 4,763,279 | 8/1988 | Kellam et al. | 364/518 |
| 4,799,172 | 1/1989 | Wood et al. | 364/518 |

*Primary Examiner*—Arthur G. Evans

[57] ABSTRACT

A system and method of applying marking fluid using plotter driven marking instruments for drawing images onto a large sheet in a minimal amount of strokes with the aid of a computer. The system includes providing the computer with data defining the desired images, and providing a preselected plurality of marking instruments having different diameter tips and stroke widths. The computer is also provided with data corresponding to and representing the stroke width for each of the preselected plurality of different diameter tip marking instruments. The computer calculates the coordinates which each instrument is to fill in on the sheet. This is based upon the size, shape, and location of the image as compared to available stroke widths. The computer provides control signals to the plotter for controllably selecting and causing each different diameter tip marking instrument to fill in the sheet at locations according to the calculated stroke coordinates. The availability of a plurality of different size tips allows the computer to instruct the plotter to fill in the image with a minimal number of strokes to reduce the completion time and wear on the plotter. The system includes a container coupled by flexible tubes to each different size marking instrument for continuously supplying ink to the tip. This avoids the need to interrupt the process to refill or replace the marking instrument.

7 Claims, 2 Drawing Sheets

SYSTEM OF OPERATING AN AUTOMATIC PLOTTER USING DIFFERENT SIZE MARKING DEVICES

This application is a continuation-in-part application of our prior copending application Ser. No. 291,537, filed on Dec. 28, 1988 now U.S. Pat. No. 4,933,876 for an invention entitled "System of Operating an Automatic Plotter".

BACKGROUND OF THE INVENTION

This invention relates generally to a system of operating an automatic plotting device having different marking instruments for drawing characters and images onto a sheet. Specifically, this invention relates to a system of operating an automatic plotter which utilizes predetermined different size diameter marking instruments which are appropriately selected, with the aid of a computer, for quickly and efficiently filling in images drawn on a large sheet. This invention is particularly, though not exclusively, useful in making positives for use in screen printing, and large posters.

DISCUSSION OF THE PRIOR ART

Automatic plotting devices which are controlled by a computer are well known and use different color drawing or marking instruments, such as pens containing ink, or other pigmented fluids, to draw images on sheets of paper or other materials. Typically, the plotter pen moves in crosswise direction across the sheet as the sheet is moved lengthwise on the plotter base, such as on a roller-type base, or on a flat bed table. The plotter pen and base move relative to one another as controlled by a computer to draw on and fill in the sheet at desired locations.

If the sheet material is clear plastic or transparent paper, such as vellum, or other suitable material, the plotter can be used to create a positive for use in the screen exposure preparation process for purposes of screen printing If opaque fluid is used in the pen to draw and fill in images on the vellum sheet, the sheet can be used as a positive to expose a final image onto a pretreated, photosensitive fabric which is stretched over a screen printing frame. When the positive is placed on the screen and exposed to light, the opaque image on the positive blocks out light to prevent a chemical reaction on the treated screen so that the areas which are not exposed to light allow ink to pass through Conversely, the areas which are exposed to light become hardened to prevent ink from passing through the screen. Thus, ink pushed through the screen passes through to the final substrate (material to be printed upon) to create the desired image on the final product, such as on t-shirts, sign materials, labels, posters, etc.

In the past, the use of automatic plotting devices to draw large images on sheets has not been feasible. Unfortunately, such plotting devices take an inordinate amount of time to fill in the characters, images and designs on the sheet. This is especially true for larger sheets, e.g. thirty-six (36) to seventy-two (72) inch wide sheets which, depending on their length, take unacceptably large amounts of time to fill in the image. Possibly even more importantly, the large number of strokes required to fill in images reduces the life of the plotter.

Normally, first drawn is the outline of the images, such as characters, letters or shapes to be displayed, using a pen. Then, the plotter proceeds to fill in the images, one line at a time. It takes an extremely long period of time, which is not practical for commercial applications and lessens the life of the plotter. Previous attempts to reduce this long period of time have focused on speeding up the movement of the pen tip to fill in the image more quickly. Unfortunately, effective higher speeds have not been obtained. Furthermore, the pen tends to skip at higher speeds.

In light of the above, the present invention recognizes the need to utilize computerized type and graphics technology in conjunction with automatic plotting devices to be able to draw and fill in images onto a large sheet in a much shorter period of time and with a minimal amount of strokes. Further, the present invention recognizes a need for such a system which will be relatively inexpensive to manufacture and operate and easily adaptable to extensive redesign of existing conventional plotting equipment and conventional computerized operating system technology.

Thus, the present invention recognizes that by utilizing appropriately and automatically selected marking instruments having different size diameter tips, larger size diameter tips can be utilized to apply pigmented fluid to the sheet at the appropriate locations to cover larger areas. This significantly reduces the overall time required to generate a large image. For example, a typical felt tip pen is approximately one hundredth (0.01) of an inch. Thus, to fill in an image which is one inch (1.0) wide, one hundred (100) strokes would be required. In contrast, a one (1.0) inch wide line utilizing a one (1.0) inch diameter tip requires only one (1) stroke, which thus covers the same area in 1/100 of the time.

It is important to note, however, that simply utilizing a large tip pen does not solve the problem, because a larger tip prohibits marking in small areas.

The present invention further recognizes that in order to accommodate marking instruments having selectively larger size diameter tips, sufficient amounts of ink must be supplied to each tip. It is further important to be able to completely fill in large images on the sheet without the need for constant monitoring to detect possible ink stoppage (or skips), or stopping the process to either refill or replace a marking instrument which has run out of ink.

Accordingly, it is an object of the present invention to provide a system of operating an automatic plotting device for drawing and filling in images onto a sheet in a relatively short period of time with a minimal amount of strokes. It is another object of the present invention to provide a system of operating an automatic plotting device which is easily manufactured, cost effective, and convenient to use. Another object of the present invention is to provide a system which increases the output of a plotter used to fill in images on a large sheet, and significantly reduce the wear on the plotter. Yet another object of the present invention is to provide a system which continuously supplies sufficient amounts of fluid to the marking instruments to allow uninterrupted completion of the images being drawn and filled in.

SUMMARY OF THE INVENTION

A preferred embodiment of the system of operating an automatic plotter having a plurality of marking instruments for drawing images onto a sheet, with the aid of a computer, comprises providing the computer with data defining a final size desired display including coordinates defining a set of images, providing the plotter with a preselected plurality of different size diameter marking instruments each having a specified stroke width, providing the computer with data representing and corresponding to the plurality of different size marking instruments and stroke width for each, calculating in the computer for each different size diameter marking instrument the coordinates of strokes defining areas on the sheet which are to be filled in by each appropriately sized marking instrument, and generating control signals to the plotter device for controllably selecting and causing each different size diameter marking instrument to fill in the areas on the sheet at locations according to the calculated stroke coordinates with a minimum of strokes The system utilizes a computer program which, based on the display image to be drawn, selects the proper size diameter marking instrument to quickly fill in the appropriate areas and to minimize the time required to do so. Use of a marking fluid on clear plastic sheets allows positives to be generated. Use of different colors can also be accommodated to produce colored posters.

In one preferred embodiment, the system includes a predetermined set of marking instruments each having a different size diameter tip for making one of a predetermined set of different size strokes, a container for holding ink, and flexible tubes connect each marker in fluid communication with the container to continuously supply ink to each selected different size diameter tip for filling in large images on the sheet. A representation of the images are stored in computer memory. The computer produces control signals which instruct the system to select appropriate marking instruments from the predetermined set which are selectively utilized to automatically draw and fill in images on the sheet.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENTS

Figure 1:
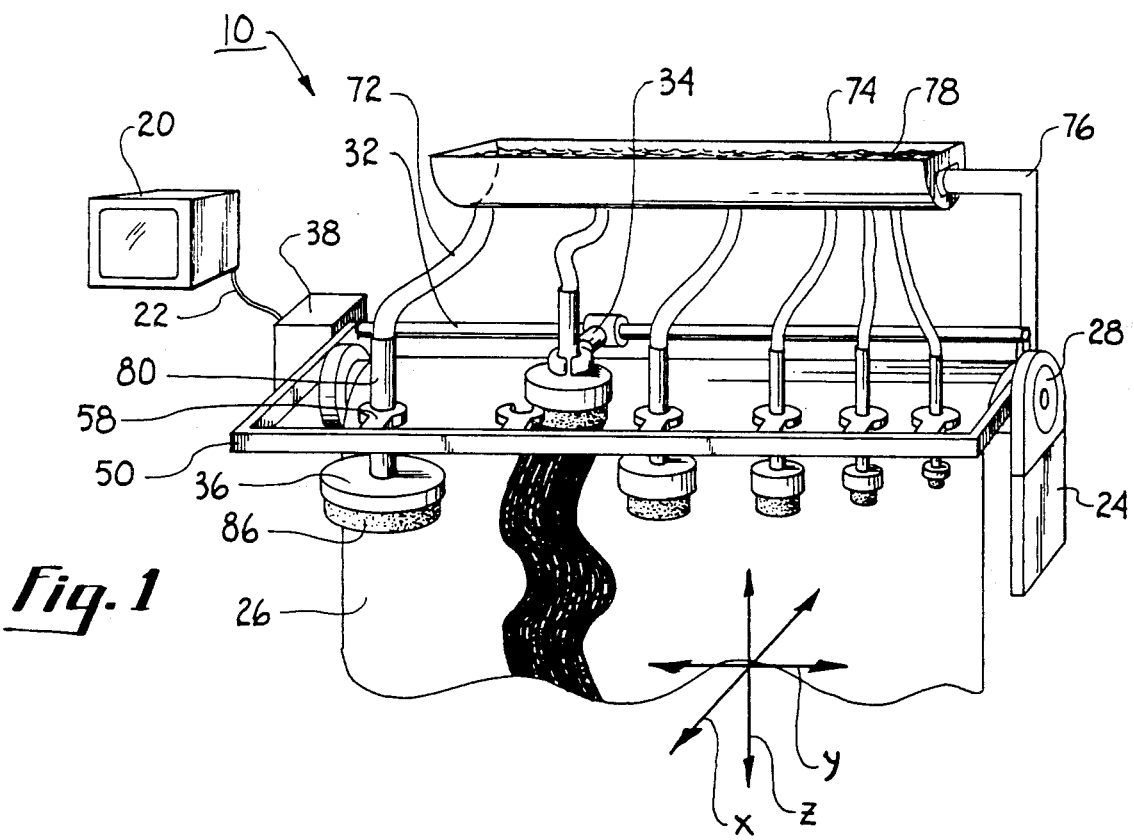
FIG. 1 is a perspective view of a system of operating an automatic plotting device including a mechanism for supplying marking fluid to marking instruments in accordance with one embodiment of the present invention.

In FIG. 1, there is shown an embodiment of the system 10 of the present invention which utilizes an automatic drawing device or plotter 24. Plotter 24 has a rotatable roller base 28 for moving a large sheet 26 of material, such as paper or vellum, upon which images are to be generated. Roller 28 is of sufficient size and shape to provide a flat surface under that portion of sheet 26 upon which the marking instruments are to be applied. Plotter 24 includes a servomechanism 38 responsive to signals input via connector 28 from computer 20. Servomechanism 38 is coupled to roller 28 to control the speed and direction of rotation of roller 28, to move the sheet as desired along the lengthwise axis indicated by arrow "x". Servomechanism 38 is also electronically coupled to extendable holder 34. Holder 34 may advantageously be in the form of a telescoping cylinder which is slidably mounted along carriage 32. The carriage 32 is positioned above roller 30 which carries sheet 26. Holder 34 is moved by servomechanism 38 as instructed by computer 20 along carriage 32 in the crosswise direction indicated by arrow "y". A plurality of different size diameter tip drawing or marking instruments 36 are operatively associated with the system. A frame 50 is mounted on plotter 24 and has various appropriately sized clasps 58 in which instruments 36 are normally automatically placed by holder 34 when not in use. The holder 34 can selectably grasp different size diameter marking instruments 36, as well as raise and lower the marking instrument 36 in the vertical direction indicated generally by arrow "z", as instructed by the computer 20. Servomechanism 38 controls the action of the carriage 32 and holder 34 in conjunction with the action of the base 28 to move the sheet 26 to specified locations.

Each marking instrument 36 is connected in fluid communication by way of a flexible tube 72 with a container 74. Container 74 is attached to a mounting bracket 76, which is attached to plotter device 24. The container 74 holds a marking fluid 78, such as ink. The ink is gravity fed through flexible tube 72 to each different size diameter marking instrument 36. Flexible tube 72 may advantageously be an elastic tube made of rubber or similar materials.

FIG. 6 illustrates a marking instrument 36 in more detail. The marking instrument 36 includes a hollow cylindrical shaft 80 which is connected in fluid communication to an orifice 82, which is located in the center of hollow disc-shaped base portion 84. Shown in phantom lines in FIG. 6 is a tip portion which is generally disc-shaped and preferably made of absorbent material. Tip 86 is seated and secured by adhesive or other suitable fashion in base portion 84. The absorbent tip 86 abuts the orifice 82. Marking fluid, such as ink, travels down from container 74 through tube 72 into shaft 80. The ink is absorbed into tip 86 for marking or painting the ink onto sheet 26. The tip 86 is preferably made of a cellular material which is suitably porous, such as felt or foam rubber, in order to allow an appropriate amount of marking fluid to percolate or seep through the tip for application onto the sheet. The material used for the tip must also be sufficiently rigid to permit sharp, crisp edges to be made when drawing or marking strokes onto the sheet. The sizes of the shaft and tubing, in combination with the tip materials chosen, are also dependent upon the amount of tip pressure and fluid being applied onto the sheet.

In the embodiment shown in FIG. 1, there are six (6) marking instruments 36 connected to the fluid container 74. Instruments 36 have tip sizes whose diameters range gradually from a smallest to largest tip as shown. By way of example, the diameters actually used are typically from one hundredth (0.01) to one (1.0) inch, but other sizes could be accommodated. In operation, the user merely places marking fluid into the container. Computer-generated image control signals sent to servomechanism 38 cause the roller 30 to appropriately move sheet 26 beneath carriage 32. Holder 34 is also caused to selectively grasp the appropriate marking instrument 36 and place it at appropriate locations on sheet 26 to draw and fill in portions of the image on the sheet 26. Each different size diameter marking instrument 36 is utilized as required with sufficient amounts of marking fluid being continuously supplied to each marking instrument. Thus, there is no need to interrupt the image drawing process to refill or change marking instruments 36. If need be, the container 74 can be refilled with ink while the system is functioning. Also large amounts of ink can thus be utilized to fill in large images.

Figure 2:
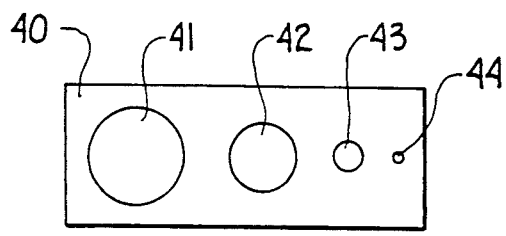
FIG. 2 is a schematic representation of different size tips for different size marking instruments for use in conjunction with the present invention.
Figure 3:
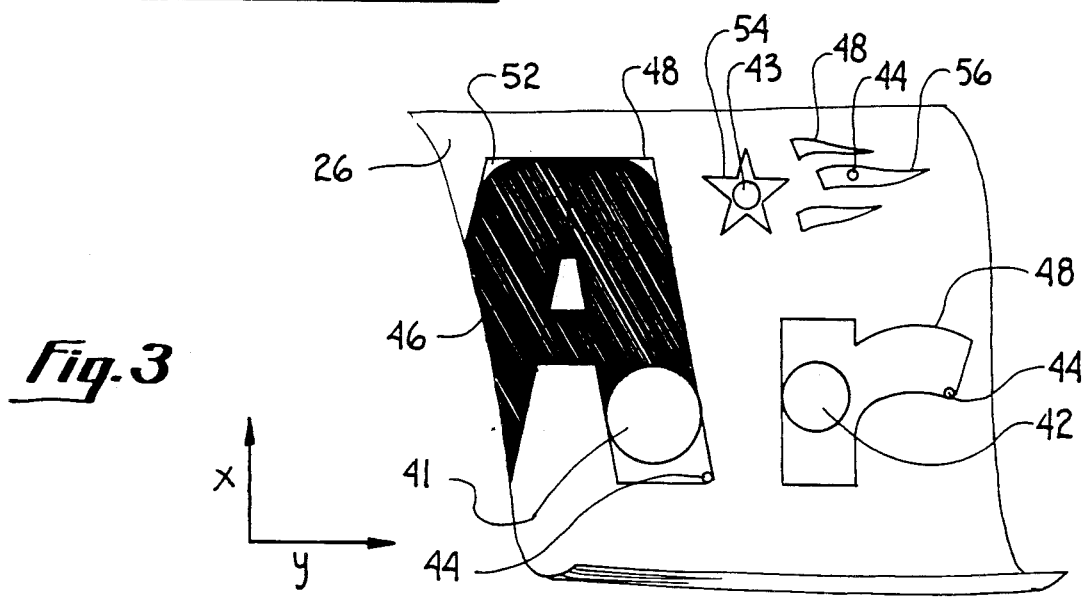
FIG. 3 is a schematic illustration showing a method of drawing and filling in images on a sheet in accordance with the present invention.

Referring now to FIGS. 2 and 3, there is shown a representation of the sheet upon which the present system has operated to draw and/or fill in various images and characters onto sheet 26. In particular, in FIG. 2, there is shown a representation 40 of different size diameter marking tips 41, 42, 43, 44 of marking instruments 36. The marking instrument 36 may be a marker (pen) or other member for placing a stroke of specified size and width onto sheet 26 as instructed by the operation of the present invention. The marking instrument 36 may preferably be a felt or mutable material tip pen having a uniform standard size diameter shaft so as to fit in conventional plotter equipment, with each marker 36 having different size marking tips 41, 42, 43, 44, defining strokes of various desired widths. The tip of the pen is preferably a flat circular shape. The fluid utilized is one appropriate for the particular application. For example, if the system is being used to create a positive, the fluid utilized within the marking pen can be any fluid of intrinsic opacity, such as red ink, india ink, or any other conventionally known opaquing fluid. If the system is being used to create a large poster, rather than a positive, then different color fluids can be utilized in conjunction with different size diameter tips.

As shown in FIG. 3, after the characters or images on sheet 26 are outlined, they are filled in by marking 46 on the sheet for each image. The sheet 26 is a material appropriate for the particular use. For example, for purposes of filling in a positive to be used for screen printing, typically a clear plastic or transparent paper, such as vellum would be appropriate. If a large poster, then paper might suffice. By way of example, the width of the sheet for standard plotting devices can be up to seventy-two (72) inches, or more. Larger devices could be utilized for larger sheets and realize the benefits of the present invention provided the different size marking tips chosen for the marking instruments 36 are in number and of appropriate diameters as may be needed for the particular application.

As further shown in FIG. 3, largest marking tip size 41 is utilized to make wide strokes onto the character "A". The smallest marking size tip 42 can be selected to make an outline 48 for each character to give it a sharp crisp edge. The remaining areas to be filled are then filled in using the appropriate diameter tip to decrease the amount of strokes, and thus time, required. For example, as shown in FIG. 3, the large diameter tip 41 is utilized to make the broad stroke, leaving area 52 in corners of the "A" to be filled in by smaller size diameter tips as required. There is also shown in FIG. 3 as an illustration of the concept that a marking instrument having smaller size diameter tip 42 could be utilized to make the smaller letter "r". Again, smallest size diameter tip 44 can be used to efficaciously draw in the smallest areas of fill. This is also true with respect to designs which may be created such as the star 54 and tails 56 shown in FIG. 3.

OPERATION

The computer 20 determines which areas of the design should be filled in with which sized marking pen 36 as explained below. Obviously, larger size marking instrument tips would not be acceptable in all areas to be filled in.

Figure 4:
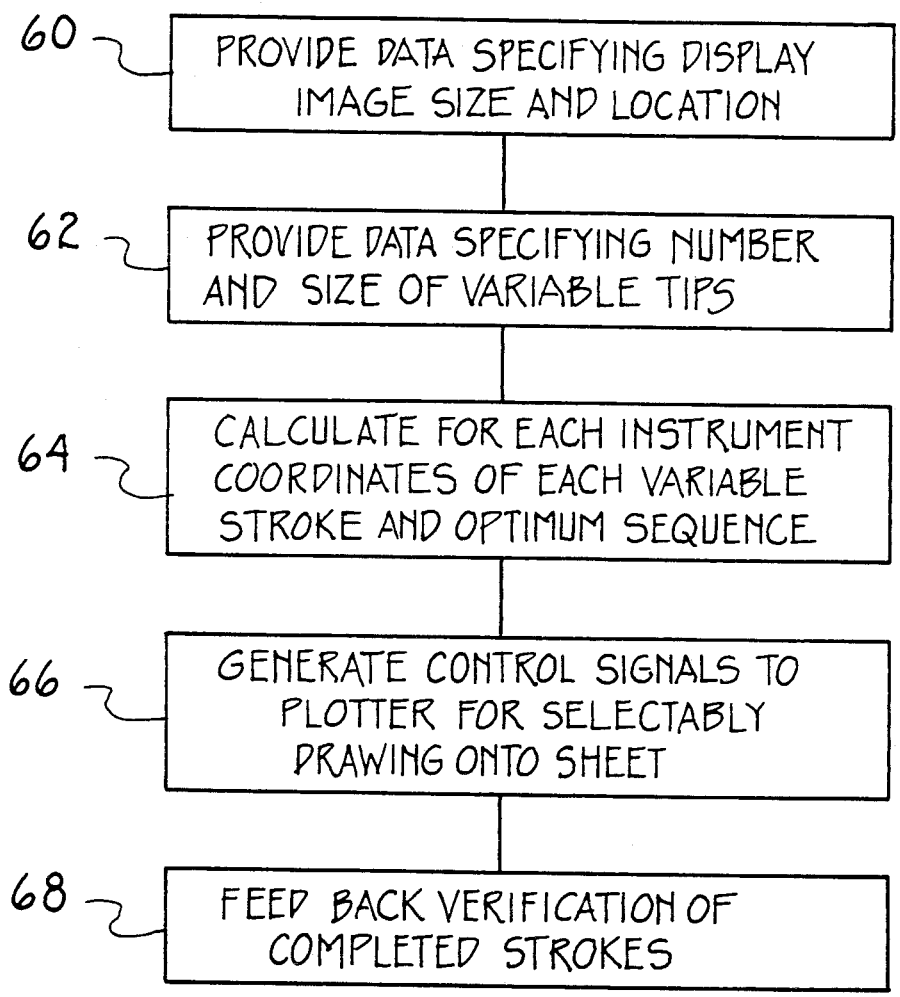
FIG. 4 is a schematic diagram of the process of one embodiment of the present invention.

Referring now to FIG. 4, there is shown a schematic flow diagram of the operation of the method with the use of a computer 20 for controlling the operation in accordance with the present invention. In particular, the computer 20 is provided 60 with data defining a final size desired image display, such as the display images shown in FIG. 5, which data includes coordinates specifying the desired finished images, and their locations on the sheet 26. The computer is also provided 62 with data representing and corresponding to a preselected representation 40 specifying the number and the different sizes of the tips for the marking instruments 36 to be utilized. Different sets of the same array of different diameter tips can be used for 4 color process, or spot color process.

Figure 5:
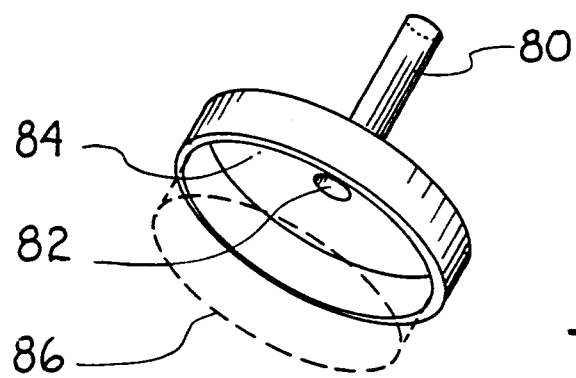
FIG. 5 is a perspective view of an embodiment of a portion of a marking instrument utilized in accordance with the present invention.

Based on the data specifying the display images, and the different size marking instrument parameters mentioned above, the computer calculates 64 for each marking instrument 36 the coordinates of strokes defining areas on the sheet 26 contained within the boundaries of the coordinates specifying the desired images. These stroke coordinates define the areas upon the sheet 26 upon which each marking instrument 36 is to place its particular size stroke. The calculations include x,y coordinates on the sheet 26, as well as when the marking instruments 36 should be raised and lowered in the z direction for marking onto the sheet as shown in FIG. 5. Based on the size of the images to be drawn on the sheet 26, and the sizes chosen for each variable size tip, the computer 20 generates control signals to select the appropriate marking instrument 36 having different size tips to mark on sheet 26 in the proper sequence at proper locations in order to minimize the amount of time required to fill in all of the images to be drawn onto sheet 26. In one embodiment, the small size tip 44 of a particular marking instrument 36 can be utilized to draw the outline for each character image, and then the appropriate size larger tip 41 of a particular marking instrument 36 can be utilized to fill in each character wherever its size permits. Likewise, the next appropriate size marking instrument 36 can then be utilized. Depending on the plotting equipment used, the strokes may move generally in the x-direction and the y-direction for each different size marking instrument 36 so that all strokes for a given pen are utilized before the next pen is selected. The largest available variable size tip would be utilized to fill or draw in the most amount of area which that particular size tip could fill in within each character. The computer generates (66) control signals to the drawing device for controllably selecting and causing each of the marking instruments 36, each having a preselected variable size tip, to draw on sheet 26 at the locations according to such calculated stroke coordinates.

There can be included feedback 68 to verify that strokes have been completed as instructed by the control signals. Also included are subroutines for optimization of the sequence to minimize the amount of strokes and time to complete a given display being drawn onto sheet 26.

Utilizing a computer 20 to calculate and select appropriate size marking instrument tips to be used to fill in large areas of sheet 26 with relatively fewer strokes allows the large sheet to be completed and ready for production in far much less time, not heretofore available in the prior art. Use of the different size marking instruments, along with the computer software for controlling same, allows the present invention to be utilized with conventional plotting equipment effectively and with little added expense, since most plotters utilize a computer controlled servomechanism for plotting data. Utilizing the plotter at a much higher productive rate for the purpose of creating filled in type and graphics in the fast and efficacious manner hereby presented allows large sheet images to be produced in a much shorter time, thereby making such production in a cost effective manner for producing large images on sheets at speeds not otherwise realized by the prior art systems and methods.

In addition, the container may advantageously be modified to include compartments for using different colors of ink. By including four compartments for utilizing the known four (4) basic process colors, one can use the present invention to produce photographic effects using conventional four color processing.

While the particular system of operating an automatic plotting device using different size marking devices as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

We claim:

1. A system for automatically applying marking fluid using plotter driven marking devices to fill in images on a sheet with a minimal amount of strokes, with the aid of a computer, comprising:
   a plurality of marking instruments having different diameter tips corresponding to a specified set of different size strokes;
   computer means which includes means for storing images to be drawn onto said sheet, and means for storing data representing said specified set of different size strokes;
   means for matching appropriately sized diameter tips with appropriately sized areas to be filled in, and means for supplying control signals representing coordinates for filling in said appropriate areas within said images using said appropriate one of said plurality of different diameter tips;
   means for selectively grasping and moving each said marking instrument to various positions in response to said control signals to fill in said images on said sheet with said marking fluid using said different diameter tips;
   a container for holding said marking fluid; and
   means for flexibly connecting each said marking instrument in fluid communication with said container to continuously supply said marking fluid to each said different diameter tip for filling in said images.

2. A system for automatically applying marking fluid as recited in claim 1, wherein said marking instrument comprises a plastic cylindrical casing having a cellular material tip secured thereto.

3. A system for automatically applying marking fluid as recited in claim 2, wherein there are six said different diameter marking instruments.

4. A system for automatically applying marking fluid as recited in claim 3, wherein said flexible connecting means comprises elastic tubing.

5. A system for automatically applying marking fluid as recited in claim 4, wherein said tips range in diameter from approximately 0.01 to 1.0 inches.

6. A system for automatically applying marking fluid as recited in claim 5, wherein said container is disposed above said marking instruments so that said marking fluid is gravity fed from said container to said marking instruments.

7. A method for automatically applying marking fluid using plotter driven marking devices to fill in images on a sheet with a minimal number of strokes, with the aid of a computer, comprising:
   providing a plurality of marking instruments having different diameter tips corresponding to a specified set of different size strokes;
   storing data representing images to be drawn onto said sheet, and data representing said specified set of different size strokes;
   supplying electronic control signals representing coordinates for filling in said images using said set of different size strokes;
   selectively grasping and moving said marking instruments to various positions in response to said electronic control signals to fill in said images on said sheet with said marking fluid using said different diameter tips;
   providing a container for holding said marking fluid; and
   flexibly connecting each said marking instrument in fluid communication with said container to continuously supply said marking fluid to each said different diameter tip for filling in said images.

* * * * *